United States Patent
Galasso et al.

(10) Patent No.: US 6,374,302 B1
(45) Date of Patent: Apr. 16, 2002

(54) METHOD AND SYSTEM TO PROVIDE AN ACTION CONTROL POINT MASTER GATEKEEPER

(75) Inventors: Linda D. Galasso, Tinton Falls; Edward M. Hope, Forked River; Michael B. Jones, Florham Park; Ram S. Ramamurthy, Manalapan, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/052,843

(22) Filed: Mar. 31, 1998

(51) Int. Cl.[7] .............................................. G06F 13/00
(52) U.S. Cl. ...................... 709/238; 709/225; 709/313; 370/389; 370/401; 379/220
(58) Field of Search .................................. 709/217, 219, 709/223, 225, 227, 238, 250, 220, 311, 313; 370/352, 357, 389, 401; 379/219, 220

(56) References Cited

U.S. PATENT DOCUMENTS

| | | | | |
|---|---|---|---|---|
| 5,790,548 A | * | 8/1998 | Sistanizadeh et al. | 370/401 |
| 5,968,121 A | * | 10/1999 | Logan et al. | 709/219 |
| 6,047,320 A | * | 4/2000 | Tezuka et al. | 709/223 |
| 6,073,142 A | * | 6/2000 | Geiger et al. | 707/500 |
| 6,122,258 A | * | 9/2000 | Brown | 370/256 |
| 6,154,463 A | * | 11/2000 | Aggarwal et al. | 370/408 |
| 6,185,288 B1 | * | 2/2001 | Wong | 379/219 |

* cited by examiner

Primary Examiner—Viet D. Vu
(74) Attorney, Agent, or Firm—Kenyon & Kenyon

(57) ABSTRACT

An action control point master gatekeeper for a communications network creates a hierarchical scalable signaling and transaction infrastructure for supporting carrier level deployment of, for example, IP telephony using H.323 terminals and gateways. The action control point master gatekeeper supports a plurality of H.323 zones in an administrative domain. Action control point master gatekeepers in an administrative domain can signal to other administrative domains via a hierarchical signaling infrastructure. A backup master gatekeeper can also be present in an action control point. A customer database, which can be distributed within zones or centralized within an administrative domain, allows for address resolution between a terminal alias and a terminal address. The customer database can also contain pointers to special purpose processes, such as network control points, to implement service specific transaction services.

43 Claims, 4 Drawing Sheets

METHOD AND SYSTEM TO PROVIDE AN ACTION CONTROL POINT MASTER GATEKEEPER

FIELD OF THE INVENTION

The invention relates to communication networks. More particularly, the invention relates to an action control point master gatekeeper for use in a communications network.

BACKGROUND OF THE INVENTION

A communications network can transmit packets of digital information between computers using a protocol, such as Internet Protocol (IP). An increasingly popular use of IP is to transmit audio, video and other multimedia communications between people. For example, a person can use an IP terminal, such as a personal computer connected to an IP network, to speak with another person with an IP terminal. The use of IP terminals to transmit voice communications, similar to the use of a standard telephone, is called IP telephony. As IP networks and IP terminals become faster and more powerful, the use of IP telephony is expected to dramatically increase.

A set of procedures, known as "H.323," are being developed to provide a foundation for audio, video and data communications over IP based networks. The H.323 procedures, such as those dated May 1996, are an umbrella recommendation from the International Telecommunications Union (ITU) to describe terminals, equipment and services for multimedia communication over a Local Area Network (LAN) that does not provide a guaranteed quality of service. Such networks are important because they are commonly used in offices, and include packet-switched Transmission Control Protocol/Internet Protocol (TCP/IP) and Internetwork Packet Exchange (IPX) over Ethernet systems.

FIG. 1 illustrates a communications system, or "zone," 100 according to known H.323 procedures. The zone 100 includes a number of "terminals" 110, such as personal computers equipped with microphones and speakers, that provide for real-time, two-way communications with another terminal 110. Each terminal 110 is associated with a terminal address, such as an IP address, which is used to address communications to that terminal 110. According to H.323 procedures, a terminal 110 must provide audio capability, and may also provide video and/or data capabilities, if desired. The terminals 110 communicate with other entities in the zone 100 over a communications network, such as an IP network. The IP network would typically connect, for example, several terminals 110 in a single office.

The zone 100 may include one or more "gateways" 120, 130 which provide real-time, two-way communications between terminals 110 in the zone 100 and the Public Switched Telephone Network (PSTN). The gateways 120, 130 can also communicate, for example, with another gateway to provide IP telephony with terminals located in another zone (not shown in FIG. 1).

A "gatekeeper" 140 provides address translation, control access and, if desired, bandwidth management in the IP network for other H.323 entities in the zone 100. Suppose, for example, a person using a terminal 110 in the zone 100 wants to establish an IP telephony call to a co-worker who also has a terminal in the same zone. The person enters the co-worker's "terminal alias" using the terminal 110, and the terminal alias is sent to the gatekeeper 140. The terminal alias could be, for example, the co-worker's name, title, telephone number, e-mail address or Web page. The gatekeeper 140 translates the terminal alias into a terminal address, such as an IP address, associated with the co-worker's terminal so that the IP telephony call can be established.

As shown in FIG. 1, the zone 100 can include several IP segments that communicate using routers 150. The zone can also include a "Multipoint Control Unit" (MCU) 160 which enables three or more terminals 110 and gateways 120, 130 to participate in a multipoint conference. As used herein, the general term "H.323 entity" refers to any H.323 component, such as, for example, a terminal 110, a gateway 120, 130, a gatekeeper 140 or an MCU 160. The zone 100 is the collection of H.323 entities and must include at least one terminal 110.

There are several problems with the use of H.323 procedures for IP telephony. One problem is that the procedures cannot be easily "scaled," or applied to larger systems. For example, the gatekeeper 140 must provide address translation for each terminal 110 in the zone 100. If, however, a person wants to contact someone in a different zone, there is no easy way to do this when a large number of users are involved. A person may want to contact one of hundreds of thousands, or millions, of other people using a terminal alias. It is not feasible to have a single gatekeeper 140 translate a terminal alias for that many users. The amount of information that would have to be stored is extremely large, and searching the information would be very time consuming. Moreover, databases for every gatekeeper in every zone would need to be constantly updated when any terminal alias or terminal address, in any zone, was changed. The maintenance and synchronization required for such a task is not practical.

Another disadvantage with the use of H.323 procedures is communications service features associated with traditional telephone service, such as the features provided by a global virtual network service, cannot be provided to IP telephony users. For example, a business may want to prevent some users from placing a telephone call outside of a "virtual" private network, which can include a number of different zones. In the traditional circuit switched network, such a call would be considered an "off network" call.

Suppose a company has offices in New York and Washington, each being supported by a different H.323 zone. The company may want to let an employee in the Washington office call other employees in the Washington office and other employees in the New York office. The gatekeeper for the Washington office, however, would not normally know the terminal alias and terminal address of each employee in the New York office. The problem obviously becomes more acute as more employees, offices and zones are added.

Other communications service features that businesses will expect include, for example, associating a password or client number with a telephone call, voice mail, and the use of calling cards. In addition to businesses, consumers have come to expect such communications service features. Moreover, an IP network carrier will need to be able to introduce new features rapidly to a large number of customers.

Still another drawback with the use of H.323 procedures for IP telephony is that only one gatekeeper 140 is present in each zone 100. If the gatekeeper 140 becomes unavailable, such as, for example, when the computer breaks down, communications in that zone 100 will come to a halt. This will make IP telephony unreliable.

In view of the foregoing, it can be appreciated that a substantial need exists for a method and apparatus allowing for a scalable, reliable and flexible IP telephony system, and for solving the other problems discussed above.

SUMMARY OF THE INVENTION

The disadvantages of the art are alleviated to a great extent by an action control point master gatekeeper. In one embodiment of the present invention, an action control point is used in a communications network that has a gatekeeper able to generate an address inquiry, including a terminal alias. The action control point has a customer database that associates the terminal alias with a terminal address. The action control point also has a master gatekeeper that receives the address inquiry and generates an address reply, including the terminal address, based on the association in said customer database.

In this way, the action control point master gatekeeper acts as the glue between zone gatekeepers. A zone gatekeeper will query to the action control point master gatekeeper for address resolution. The action control point can include a centralized database that associates a terminal alias with a terminal address. The master gatekeeper receives the query, with a terminal alias that needs address resolution, from the zone gatekeeper and looks up the terminal address corresponding to the terminal alias. The terminal address is then returned to the zone gatekeeper. If desired, a zone gatekeeper can maintain a local database for the terminals in that zone. In this case, the zone gatekeeper only queries the master gatekeeper when the address is outside of that zone.

In another embodiment of the present invention, the action control point provides a communications service feature based on a requesting terminal identifier in the address inquiry. Such a communications service feature can be provided with the use of, for example, a Network Control Point (NCP).

In this way, the action control point master gatekeeper acts as the glue between a zone gatekeeper and specialized processes, such as NCPs. One example of such an NCP would be for authorization codes. The zone gatekeeper sends an address resolution request to the master gatekeeper. The master gatekeeper realizes that the request needs special processing using a table entry in the master database. The master gatekeeper contacts a NCP process, such as an authorization code NCP process, which in turn requests an authorization code from the end user and verifies the code. The NCP process, such as an authorization code NCP process, returns control to the master gatekeeper, which completes the address resolution by sending a reply to the zone gatekeeper.

In another embodiment of the invention, a master gatekeeper queries another master gatekeeper to resolve an address. An action control point master gatekeeper can be configured with an arbitrary number of zone gatekeepers into an "administrative domain." A master gatekeeper from one administrative domain can query a higher level master gatekeeper. The higher level administrative domain master gatekeeper queries the master gatekeeper within a second administrative domain. In this way, a hierarchical network of master gatekeepers can be created to allow for scalable networks. A zone gatekeeper makes an address resolution request to a master gatekeeper, which makes a second request to a higher level master gatekeeper. The higher level master gatekeeper can make a third request to another lower level master gatekeeper, which can either access a master database or query the terminating zone gatekeeper. There can be as many levels of master gatekeepers as required by the size of the network.

In still another embodiment, a backup master gatekeeper can be present in the action control point in addition to the normally used, or "primary," master gatekeeper. A similar backup gatekeeper can be used in a typical H.323 zone. This can be done, for example, by having an action control point master gatekeeper act as a backup zone gatekeeper. Redundant gatekeeper processes can pass queries back and forth so they remain synchronized with the current state of the network at all times.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 2:
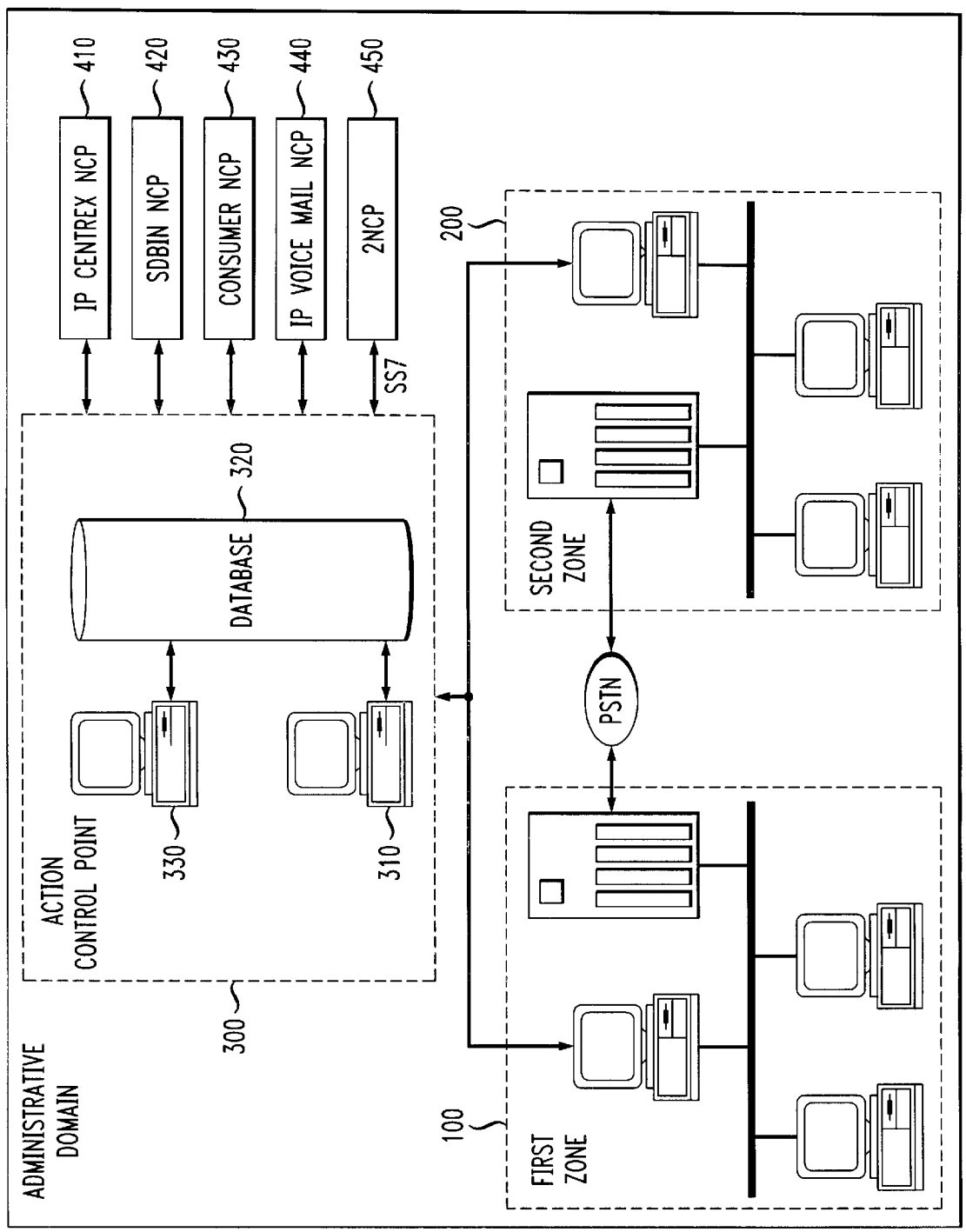
FIG. 2 is a communications network, including an action control point, according to an embodiment of the present invention.

The present invention is directed to an action control point master gatekeeper. Referring now in detail to the drawings wherein like parts are designated by like reference numerals throughout, there is illustrated in FIG. 2 a communications network, including an action control point 300, according to an embodiment of the present invention.

Figure 1:
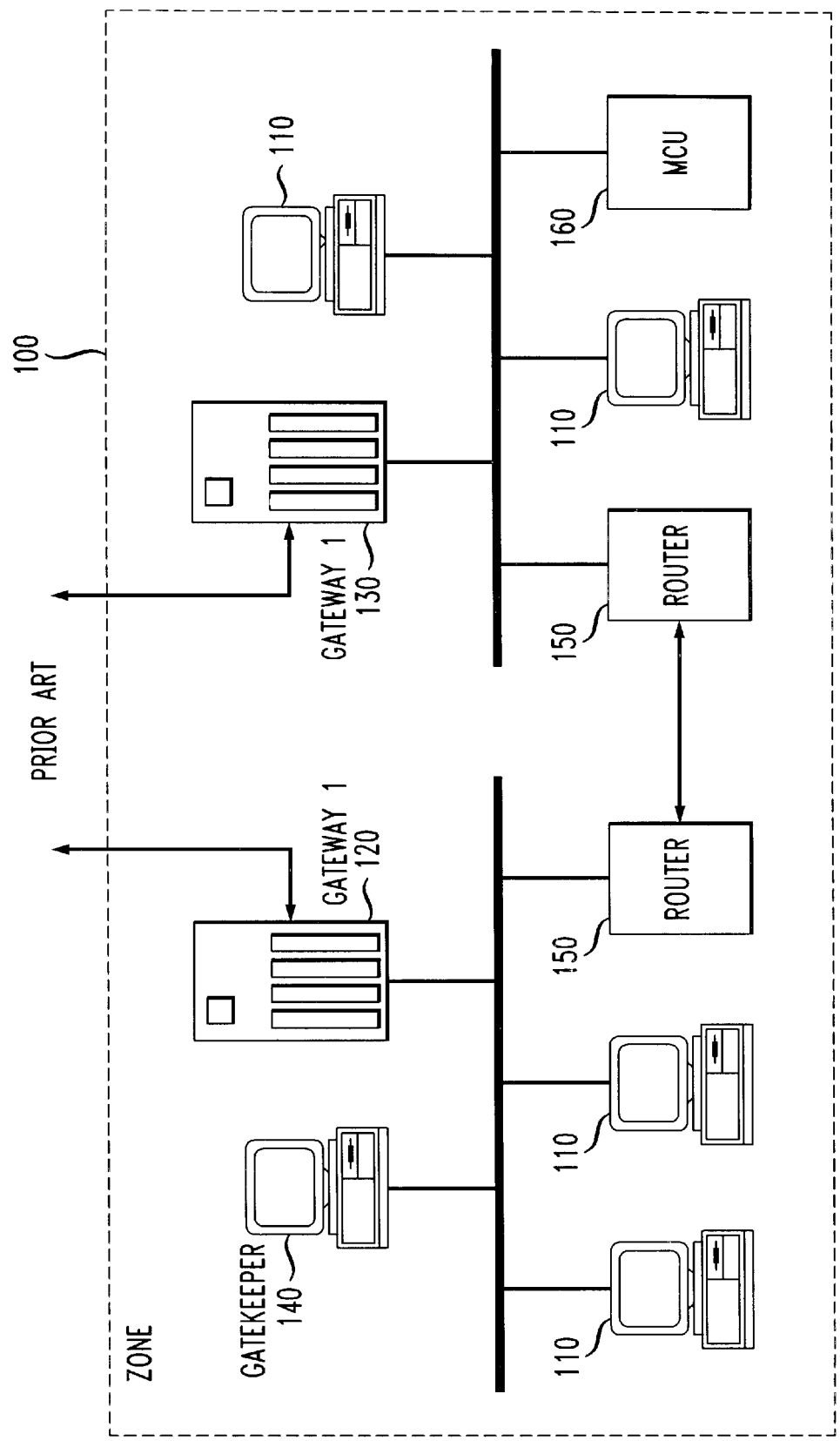
FIG. 1 is a communications zone according to known H.323 procedures.

The communications network includes two H.323 zones 100, 200. As explained with respect to FIG. 1, each zone 100, 200 can include terminals (T), gateways (GW) and gatekeepers (GK), as well as other H.323 entities. Terminals in each zone communicate, such as by IP telephony, with other terminals in that zone. A gateway can let a terminal communicate with other zones and the PSTN. Each zone has a gatekeeper that provides address translation for calls originating in that zone.

According to an embodiment of the present invention, the gatekeeper in each zone also communicates with an action control point 300, which includes a master gatekeeper 310 and a customer database 320. When a terminal in one zone 100 wants to communicate with a terminal in a different zone 200, the gatekeeper in the first zone 100 sends an address inquiry, including the terminal alias of the "called" terminal, to the master gatekeeper 310. The customer database associates a terminal address with one or more terminal aliases for each terminal in each zone served by the action control point 300. When the master gatekeeper 310 receives the address inquiry, it uses the customer database 320 to determine the terminal address associated with the terminal alias. In place of a local customer database, a master gatekeeper could instead send an address inquiry, including the terminal alias of the "called" terminal, to the zone gatekeeper of the called zone. The zone gatekeeper of the called zone would resolve the address and the master gatekeeper would forward the information to the calling zone gatekeeper. As will be explained with respect to FIG. 3, a master gatekeeper could also send the address inquiry to another master gatekeeper in a different administrative domain. The second master gatekeeper would access its own customer database, or query a zone gatekeeper in the called zone, to resolve the address.

Once the terminal address has been determined, the master gatekeeper 3 1 0 sends an address reply, including the terminal address, back to the zone gatekeeper of the calling terminal. The communication can then be established between the terminal in zone 100 and the terminal in zone 200 using normal H.323 signaling. By way of example, an action control master gatekeeper can support a number of zones within an administrative domain.

Thus, the master gatekeeper 310 in the action control point 300 provides the signaling infrastructure to extend H.323, which currently does not scale to support carrier requirements, into scalable, reliable carrier class infrastructures. In the circuit switching infrastructure, Signaling System Number 7 (SS7) provides the intelligent signaling infrastructure for advanced services. The action control point 300, including the master gatekeeper 310, provides the signaling infrastructure for scalable, reliable and flexible IP network services in an analogous manner. Gatekeepers communicate with each other in an unspecified manner in the H.323 standard, and the present invention imposes a hierarchical signaling infrastructure between gatekeepers, gateways and terminals. Each terminal and gateway will have a primary gatekeeper within a zone. Communications between gatekeepers in different zones will occur using the action control point 300, including the master gatekeeper 310, which maintains a distributed database for use by all zone gatekeepers. Communication between administrative domains occurs using a hierarchical signaling between master gatekeepers.

The master gatekeeper 310 can include a communications port configured to exchange information with a zone gatekeeper and a processor configured to provide address translation between an alias address and a transport address. An alias address could be, for example, an e-mail name or a telephone number. A transport address could be, for example, an IP address. The customer database 320 maps these addresses, and zone gatekeepers can query the master gatekeeper 310 for address translation. Table 1 shows a sample entry in the customer database 320.

TABLE 1

Sample Customer database Entry

| Alias Address | Transport Address | Attribute |
|---|---|---|
| Mike Jones | 135.16.34.11 | Name |
| MBJ@attmail.com | 135.16.34.11 | e-mail |
| www.mbj.com | 135.16.34.11 | URL |
| 908-555-2262 | 135.16.34.11 | Telephone |

A terminal can setup a call to the "Mike Jones" terminal, or endpoint, using any alias 15address. The zone gatekeeper for the originating terminal would query the master gatekeeper 310 to identify the transport address, and the master gatekeeper 310 would return the transport address to the zone gatekeeper. The zone gatekeeper could then complete the call setup normally.

An embodiment of the present invention also lets an IP network carrier provide communications service features, such as "admission control." The rules defining the admission control can be stored as attributes in the customer database 320 or in a separate communications service features database (not shown in FIG. 2). This will let a carrier introduce IP Private Branch Exchange (PBX) features, such as network services. These carrier-based services are referred to as "IP Centrex." Another example would be for a carrier to provide "virtual" network services, such as a Software Defined Network (SDN). The current standards for H.323 do not provide the feature functionality customers expect for IP telephony, so an embodiment of the present invention extends H.323 standards to support, for example, a Software Defined Business IP Network (SDBIN). It is likely, for example, that customers will expect the same features currently offered, such as traditional PBX features, to be present on IP phones. Because the action control point 300 provides a single point to store communications service feature attributes, a carrier can provide new services in a rapid and efficient manner to a large number of users.

Table 2 shows an action control point 300 database with one simple attribute, "on/off network." For endpoints in a virtual private network, the on/off network attribute indicates if the originating terminal can call "off-network" to someone on the Internet, or another virtual private network. The on/off network attribute can also indicate if an authorization code is required for the call.

TABLE 2

Sample Database Attribute

| Source Address | Transport Address | On/Off Network Attribute |
|---|---|---|
| 908-555-2262 | 135.16.34.11 | Yes |
| 908-555-5386 | 135.16.34.12 | No |
| 908-555-3300 | 135.16.34.13 | SDBIN NCP |
| 908-555-8039 | 135.16.34.14 | Consumer NCP |

Assume the four source addresses in Table 2 are part of a virtual private network managed by zone 100 in FIG. 2. Source address 908-555-2262 can call terminals both on and off the virtual network. Source address 908-555-5386 can only call other locations in the virtual private network, i.e. "on" network calls only. Source address 908-555-3300 requires that the action control point 300 request special processing from a service specific NCP. For example, a SDBIN NCP 420 might prompt source address 908-555-3300 for an authorization code, and the SDBIN NCP 420 could authenticate the authorization code. An IP Centrex NCP 410 could provide "classic PBX features" like hold, transfer, conference and drop calls. Other features that could be offered according to the present invention include: numbering plans; flexible routing; to sub-network partitioning; location screening; feature screening; and credit card authentication.

For a consumer application, the action control point 300 can request that a consumer NCP 430 authenticate an authorization code, such as a credit card. For the corporate customer, the authorization code could be the same authorization code used for a circuit switched virtual private network. Different NCPs can implement different features. One interface to a traditional 2NCP 450 would be through the use of Transaction Capabilities Part (TCAP) queries. Consumer NCPs can provide conventional telecommunication Custom Local Area Signal Service (CLASS) features such as call waiting, and call forwarding. Moreover, customized billing options, such as calling cards, can be implemented.

Thus, the present invention can easily provide communications service features to H.323 terminals. Carriers require service delivery platforms that facilitate rapid service introduction, such as, for example, an IP voice mail NCP 440. The zone gatekeeper would establish the call using the action control point 300 as described above. If there is no answer, the zone gatekeeper can ask the master gatekeeper 310 for instructions. The master gatekeeper 310 would call the IP voice mail NCP 440 to provide a voice mailbox. This could be done, for example, using a well accepted Application Programming Interface (API), such as a Telephone API (TAPI), from the master gatekeeper 310 to servers that implement the desired functionality.

To make the action control point 300 more reliable, a backup master gatekeeper 330 can be provided according to an embodiment of the present invention. The backup master gatekeeper 330 is a "hot backup" in that it is maintained in a state identical to the state of the primary master gatekeeper 310. The backup master gatekeeper 330 will take over the action control point 300 when the primary master gatekeeper 310 becomes unavailable, such as when the primary master gatekeeper 310 becomes not operational. In this way, the backup master gatekeeper 330 provides redundant functionality for reliability purposes. Such an implementation can also be used to provide redundant functionality within a typical H.323 zone. This could be done, for example, by having a master gatekeeper act as a backup zone gatekeeper for one or more zones.

Figure 3:
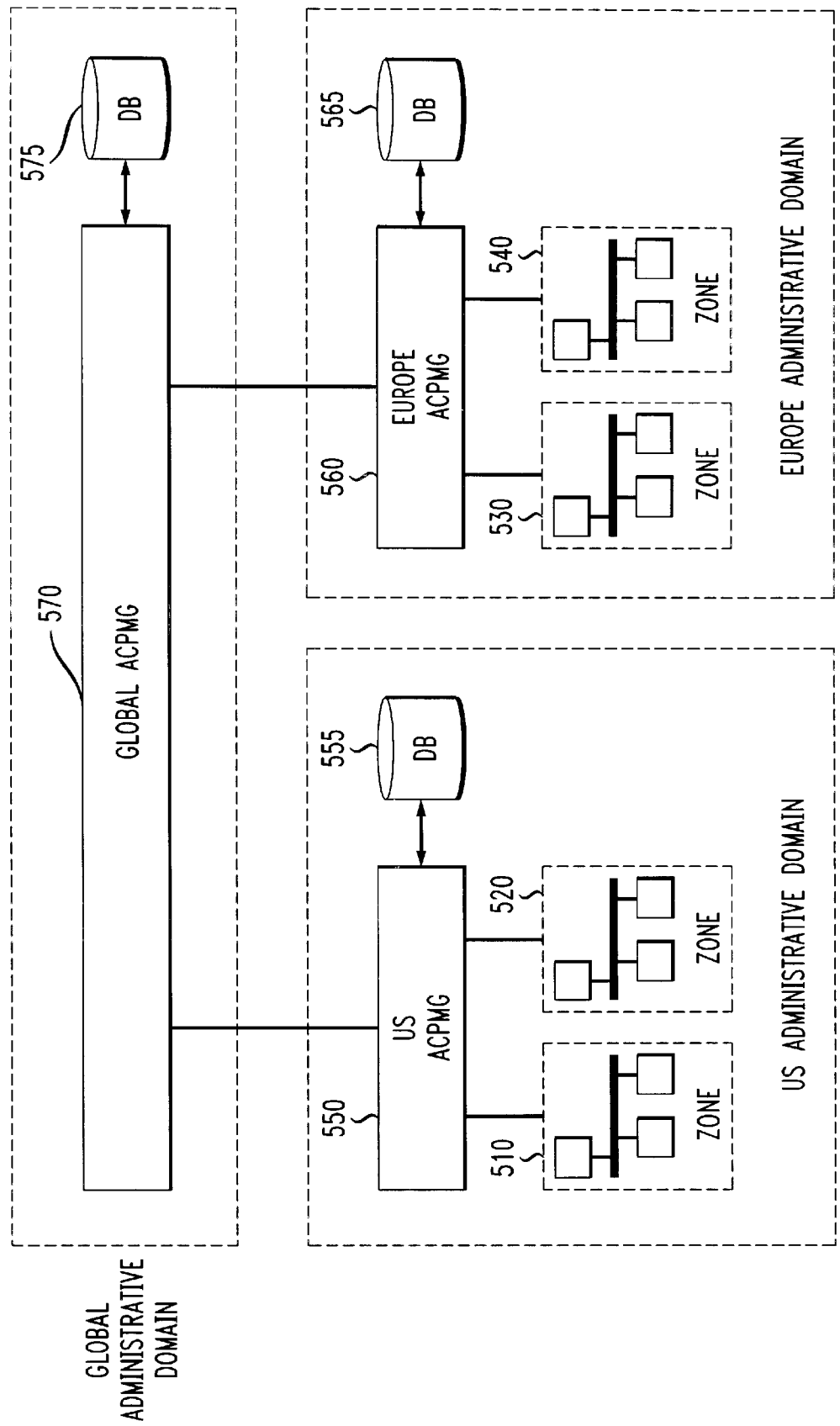
FIG. 3 is a communications network, including several administrative domains, according to an embodiment of the present invention.

In addition to providing a signaling infrastructure for communications service features, an embodiment of the present invention provides a network of action control points that can scale. For extremely large networks, a hierarchy of administrative domains can be implemented. FIG. 3 shows such a communications network, including several administrative domains with their associated master gatekeepers 550, 560, 570. As shown in FIG. 3, a US master gatekeeper 550 and associated database 555 supports two zones 510, 520 in the United States, forming one administrative domain. Although two zones 510, 520 are shown in FIG. 3, it will be understood that any number of zones may exist. A Europe master gatekeeper 560 and associated database 565 also supports two zones 530, 540 in Europe, resulting in another administrative domain. If desired, the US master gatekeeper 550 can directly query the Europe master gatekeeper 560 for address translation when required.

Alternately, a third level administrative domain, such as a global master gatekeeper 570 and associated database 575 could integrate the other administrative domains in the network. Consider, for example, a call placed from a terminal in the United States to a terminal in Europe. A zone gatekeeper in the United States would first query the US master gatekeeper 550. The US master gatekeeper 550 would query the global master gatekeeper 570, which would in turn query the Europe master gatekeeper 560. The distribution of the databases between the various master gatekeepers 550, 560, 570, and the various zone gatekeepers, is merely an implementation consideration.

Figure 4:
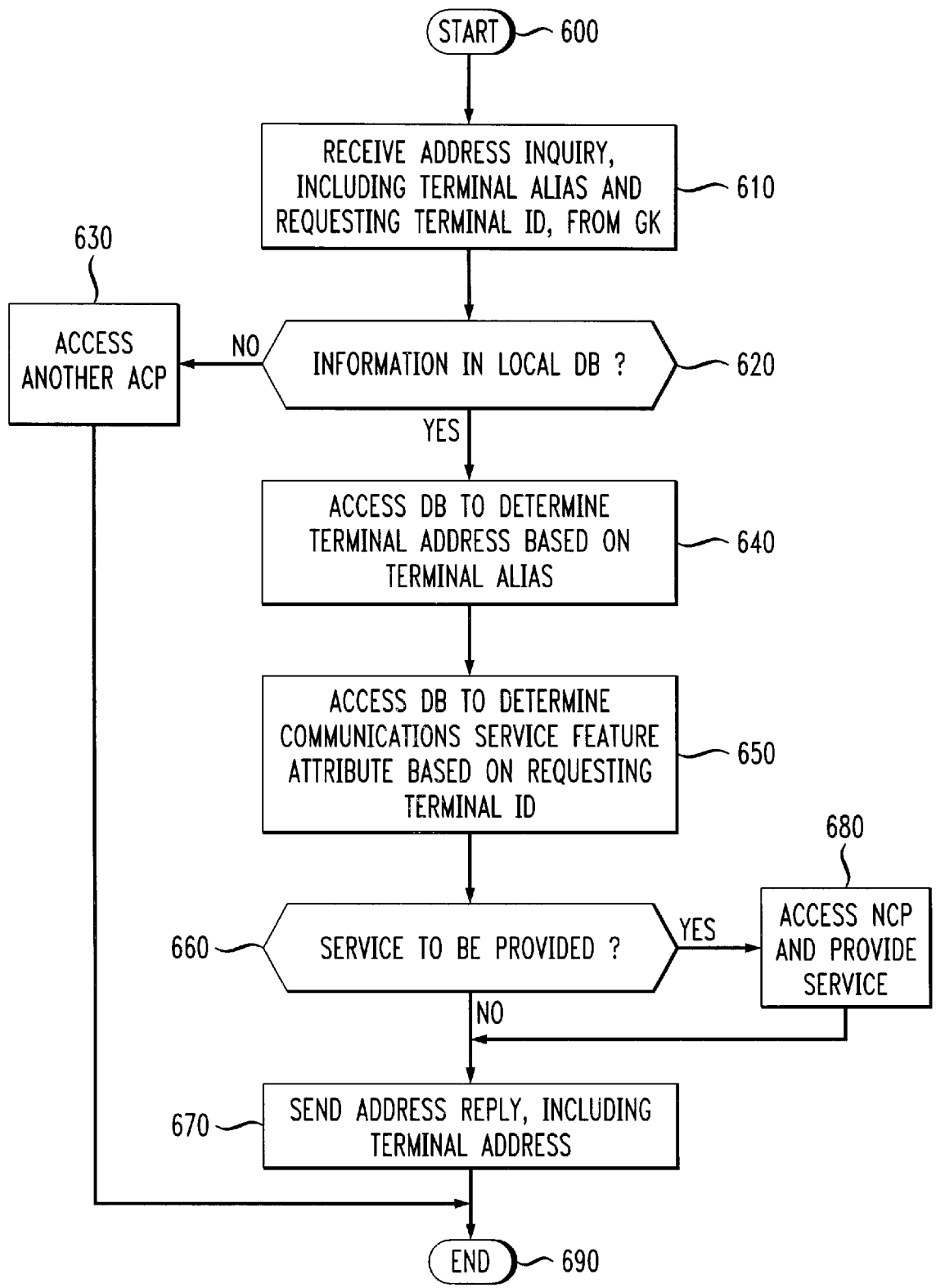
FIG. 4 is a block flow diagram of a method used with an action control point according to an embodiment of the present invention.

FIG. 4 is a block flow diagram of a method used with an action control point according to an embodiment of the present invention. After beginning at step 600, a master gatekeeper, such as the one shown in FIG. 2, receives an address inquiry, including a terminal alias and a source or requesting terminal identifier, from a zone gatekeeper at step 610. If the information is not present in the local database at step 620, another action control point could be queried at step 630. If the information is present in the local database at step 620, the database is accessed to determine the terminal address associated with the terminal alias at step 640.

The database can also indicate if a communications service feature should be provided based on the requesting terminal identifier at step 650. If a service is to be provided at step 660, an NCP can be accessed to provide the service at step 680. Finally, an address reply, including the terminal address, can be sent back to the zone gatekeeper at step 670 before the process ends at step 690.

Although various embodiments are specifically illustrated and described herein, it will be appreciated that modifications and variations of the present invention are covered by the above teachings and within the purview of the appended claims without departing from the spirit and intended scope of the invention. For example, although particular communications service features were used to describe the present invention, it will be understood that other features will also fall within the scope of the invention.

What is claimed is:

1. An action control point for a communications network, the network having a zone gatekeeper configured to generate an address inquiry, including a terminal alias, comprising:
    a customer database associating the terminal alias with a terminal address; and
    a master gatekeeper coupled to said customer database, said master gatekeeper being configured to receive the address inquiry, including the terminal alias, and to generate an address reply, including the terminal address, based on the association in said customer database.

2. An action control point according to claim 1, wherein said master gatekeeper is further coupled to a local area network, including the zone gatekeeper, that does not provide a guaranteed quality of service and said master gatekeeper receives the address inquiry from the zone gatekeeper.

3. An action control point according to claim 2, wherein the address inquiry is received prior to the establishment of an Internet protocol telephony call by the zone gatekeeper.

4. An action control point according to claim 1, wherein said master gatekeeper is further configured to send a second address inquiry, including the terminal alias, to a second master gatekeeper if the terminal alias is not in said customer database.

5. An action control point according to claim 1, wherein the address inquiry also includes a requesting terminal identifier, further comprising:
    a communications service feature database associating the requesting terminal identifier with a communications service feature attribute;
    wherein said master gatekeeper is coupled to said communications service feature database, and the communications service feature is provided based on the association in said communications service feature database.

6. An action control point according to claim 5, wherein the communications service feature attribute indicates whether the requesting terminal identifier is permitted to communicate outside a virtual network.

7. An action control point according to claim 5, wherein the communications service feature is voice mail.

8. An action control point according to claim 5, wherein the communications service feature requires a user to enter a code before a requested communication is established.

9. An action control point according to claim 5, wherein the communications service feature database is a network control point.

10. An action control point according to claim 1, further comprising:

a backup master gatekeeper coupled to said customer database, said backup master gatekeeper being configured to receive the address inquiry, including the terminal alias, and generate an address reply, including the terminal address, based on the association in said customer database when said master gatekeeper is not available.

11. An action control point according to claim 1, wherein the terminal alias is an H.323 alias address and the terminal address is an H.323 transport address.

12. A master gatekeeper for use in a communications network, the network having a gatekeeper configured to generate an address inquiry, including a terminal alias, comprising:
   a communications port configured to receive the address inquiry; and
   a processor coupled to said communications port, said processor being configured to generate an address reply, including a terminal address, based on the terminal alias, and further configured to output the address reply through said communications port.

13. A master gatekeeper according to claim 12, further comprising:
   a second communications port coupled to said processor, said second communications port being configured to communicate with a second master gatekeeper,
   wherein said processor is further configured to send a second address inquiry, including the terminal alias, to the second master gatekeeper when said processor cannot determine the terminal address.

14. A master gatekeeper according to claim 12, further comprising:
   a second communications port coupled to said processor, said second communications port being configured to communicate with a second zone gatekeeper,
   wherein said processor is further configured to send a second address inquiry, including the terminal alias, to the second zone gatekeeper.

15. A master gatekeeper according to claim 12, wherein the address inquiry also includes a requesting terminal identifier, further comprising:
   a second communications port coupled to said processor, said second communication port being configured to communicate with a communications service feature database,
   wherein said processor is further configured to access the communications service feature database to determine a communications service feature attribute based on the requesting terminal identifier.

16. A master gatekeeper according to claim 15, wherein the communications service feature database is a network control point.

17. A master gatekeeper according to claim 12, wherein the terminal alias is an H.323 alias address and the terminal address is an H.323 transport address.

18. A gatekeeper for use in a communications network, comprising:
   a first communications port configured to receive a request to communicate, including a terminal alias;
   a processor coupled to said first communications port, said processor being configured to generate an address inquiry, including the terminal alias; and
   a second communications port coupled to said processor, said second communications port being configured to output the address inquiry and to receive an address reply, including a terminal address associated with the terminal alias.

19. A gatekeeper according to claim 18, wherein the terminal alias is an H.323 alias address and the terminal address is an H.323 transport address.

20. A communications network, comprising:
   a first zone, comprising:
      a first terminal having a first address and a first alias, said first terminal being configured to send and receive communications over a first network,
      a first gateway coupled to the first network and, said first gateway being configured to send and receive communications for the first network, and
      a first gatekeeper coupled to the first network;
   a second zone, comprising:
      a second terminal configured to send and receive communications over a second network, said second terminal being further configured to generate a request to communicate with said first terminal, the request including the first alias,
      a second gateway coupled to the second network and said first gateway, said second gateway being configured to send and receive communications between the first and second networks, and
      a second gatekeeper coupled to the second network, said second gatekeeper being configured to receive the request to communicate, and further configured to generate an address inquiry, including the first alias; and
   an action control point, comprising:
      a customer database associating the first alias with the first address, and
      a master gatekeeper coupled to said customer database, said first gatekeeper and said second gatekeeper, said master gatekeeper being configured to receive the address inquiry from said second gatekeeper, and further configured to generate an address reply containing the first address based on the association in said customer database.

21. A communications network according to claim 20, wherein said master gatekeeper is further configured to send a second address inquiry, including the terminal alias, to a second master gatekeeper if the terminal alias is not in said customer database.

22. A communications network according to claim 20, wherein the address inquiry also includes a requesting terminal identifier, further comprising:
   a communications service feature database associating the requesting terminal identifier with a communications service feature attribute;
   wherein said master gatekeeper is coupled to said communications service feature database, and the communications service feature is provided based on the association in said communications service feature database.

23. A communications network according to claim 22, wherein said communications service feature database is a network control point.

24. A communications network according to claim 20, further comprising:
   a backup master gatekeeper coupled to said customer database, said backup master gatekeeper being configured to receive the address inquiry, including the terminal alias, and to generate an address reply, including the terminal address, based on the association in said customer database when said master gatekeeper is not available.

25. A communications network according to claim 20, wherein the terminal alias is an H.323 alias address and the terminal address is an H.323 transport address.

26. A method of determining a terminal address in a communications network, comprising the steps of:
   receiving from a gatekeeper an address inquiry, including a terminal alias, at an action control point;
   determining the terminal address associated with the terminal alias; and
   sending an address reply, including the terminal address, to the gatekeeper.

27. The method of claim 26, wherein said step of determining comprises the step of accessing a customer database to determine a terminal address associated with the terminal alias.

28. The method of claim 26, wherein said step of determining comprises the step of accessing a second action control point to determine a terminal address associated with the terminal alias.

29. The method of claim 26, wherein the address inquiry includes a requesting terminal identifier, further comprising the step of:
   providing a communications service feature based on the requesting terminal identifier.

30. The method of claim 29, wherein said step of providing comprises the steps of:
   accessing a communications service feature database; and
   providing the communications service feature based on an association in said communications service feature database between the requesting terminal identifier and a communications service feature attribute.

31. The method of claim 26, wherein said steps of receiving, determining and sending are performed by a master gatekeeper coupled to a local area network, including the gatekeeper, that does not provide a guaranteed quality of service.

32. The method of claim 26, wherein the terminal alias is an H.323 alias and the terminal address is an H.323 transport address.

33. The method of claim 26, wherein said steps of receiving, determining and sending are performed prior to the establishment by the gatekeeper of an Internet protocol telephony call.

34. The method of claim 33, further comprising the step of:
   determining whether to provide a communications service feature for the telephony call.

35. The method of claim 34, wherein the communications service feature is allowing the telephony call to be placed outside a virtual network.

36. The method of claim 34, wherein the communications service feature is voice mail.

37. The method of claim 34, wherein the communications service feature requires a user to enter a code before the telephony call is established.

38. An apparatus to determine a terminal address in a communications network, comprising:
   means for receiving from a gatekeeper an address inquiry, including a terminal alias, at an action control point;
   means for determining a terminal address associated with the terminal alias; and
   means for sending an address reply, including the terminal address, to the gatekeeper.

39. An apparatus according to claim 38, wherein the terminal alias is an H.323 alias address and the terminal address is an H.323 transport address.

40. A communications network, comprising:
   a terminal configured to send and receive communications over the network;
   a gateway coupled to the network, said gateway being configured to send and receive communications for the network;
   a primary gatekeeper coupled to the network, said primary gatekeeper being configured to provide address translation; and
   a backup gatekeeper coupled to the network, said backup gatekeeper being configured to provide address translation when said primary gatekeeper is not available.

41. A communications network according to claim 40, wherein said terminal, said gateway, said primary gatekeeper and said backup gatekeeper are H.323 entities.

42. A communications network according to claim 40, wherein said primary gatekeeper is configured to generate an address inquiry, including a terminal alias, and said backup gatekeeper is a master gatekeeper, comprising:
   a communications port configured to receive the address inquiry from said gatekeeper; and
   a processor coupled to said communications port, said processor being configured to generate an address reply, including a terminal address, based on the terminal alias, and further configured to output the address reply through said communications port.

43. A hierarchy of master gatekeepers for use in a communications network, the network having a gatekeeper configured to generate a first address inquiry, including a terminal alias, comprising:
   a first master gatekeeper configured to receive the first address inquiry and to generate a second address inquiry, including the terminal alias;
   a global master gatekeeper coupled to said first master gatekeeper, said global master gatekeeper being configured to receive the second address inquiry and to generate a third address inquiry, including the terminal alias; and
   a second master gatekeeper coupled to said global master gatekeeper, said second master gatekeeper being configured to receive the third address inquiry and to generate a first address reply, including a terminal address associated with the terminal alias;
   wherein said global master gatekeeper is further configured to receive the first address reply and generate a second address reply, including the terminal address, and said first master gatekeeper is further configured to receive the second address reply and generate a third address reply, including the terminal alias, to resolve the first address inquiry.

* * * * *